United States Patent Office 3,400,858
Patented Sept. 10, 1968

3,400,858
APPARATUS FOR FEEDING SIMILAR ARTICLES
Harald Strohmeier and Bertram Hebenstreit, Kapfenberg, Austria, assignors to Gebr. Bohler & Co. Aktiengesellschaft, Vienna, Austria
Filed Nov. 1, 1966, Ser. No. 591,294
Claims priority, application Austria, Nov. 10, 1965, A 10,113/65
6 Claims. (Cl. 221—225)

ABSTRACT OF THE DISCLOSURE

A rod feeding machine, particularly adapted to feed welding electrodes from a hopper or chute to a revolving conveyor belt. Underneath the hopper or chute, there are disposed a pair of guide walls, which are adjustably connected to each other by means of a pair of straps, which are pivotally connected at their respective ends to the pair of guide walls, so that the passage defined between the pair of guide walls can be adjusted in accordance with the diameter of the welding electrodes. A cylinder is operatively mounted underneath the pair of guide walls. One of the guide walls extends close to the periphery of the cylinder, whereas the lower end of the other guide wall is spaced from the periphery of the cylinder a distance which is approximately equal to the diameter of the welding electrodes being fed from the chute or hopper. The pair of guide walls is operatively connected to means which oscillate it at a predetermined frequency. The revolving conveyor and cylinder rotate at speeds which are synchronized with the oscillating frequency of the pair of guide walls.

---

This invention relates to an apparatus for feeding similar, substantially rodlike workpieces, particularly welding electrodes, in which apparatus the workpieces are fed with parallel longitudinal axes from a supply container to a vertical or inclined chute, which is disposed over a belt conveyor and comprises two opposite guide walls, which conform to the cross-section of the rods.

In known apparatus for feeding bulk materials, such as rods, from a processing machine or a belt conveyor to a processing or packaging machine, the workpieces pass from a supply hopper into a narrow guide chute and reach the processing machine in an uninterrupted sequence. These known apparatus are not capable to deposit the rods so that they have the same direction and are parallel to each other and evenly spaced if the number of rods arriving per second exceeds a predetermined value. Owing to the acceleration imparted to the approximately vertically arriving rods when they contact the horizontal belt conveyor, which revolves at a high speed corresponding to the high delivery rate, the rods assume crosswise orientations or roll opposite to the movement of the belt conveyor, or fall from the belt and inflict damage to the conveyor installation. These disadvantages are mainly due to the sudden change in the direction of movement and the high acceleration in the new direction of movement.

In order to achieve a uniform distribution and a correct orientation of the rods on the belt conveyor, to which the rods are fed at a high rate along guide walls from a supply container, it is suggested according to the invention to arrange the guide walls of the chute so that one wall extends to the periphery of an underlying cylinder and the other terminates short of the periphery of the cylinder approximately by the cross-section of the rod, to connect the guide walls to a eccentric disc or camwheel and to divide the surface of the underlying conveyor belt by transverse ribs.

The invention will be explained with reference to an illustrative embodiment, which is shown on the accompanying drawing in a transverse sectional view taken through the conveyor installation.

Figure 1:
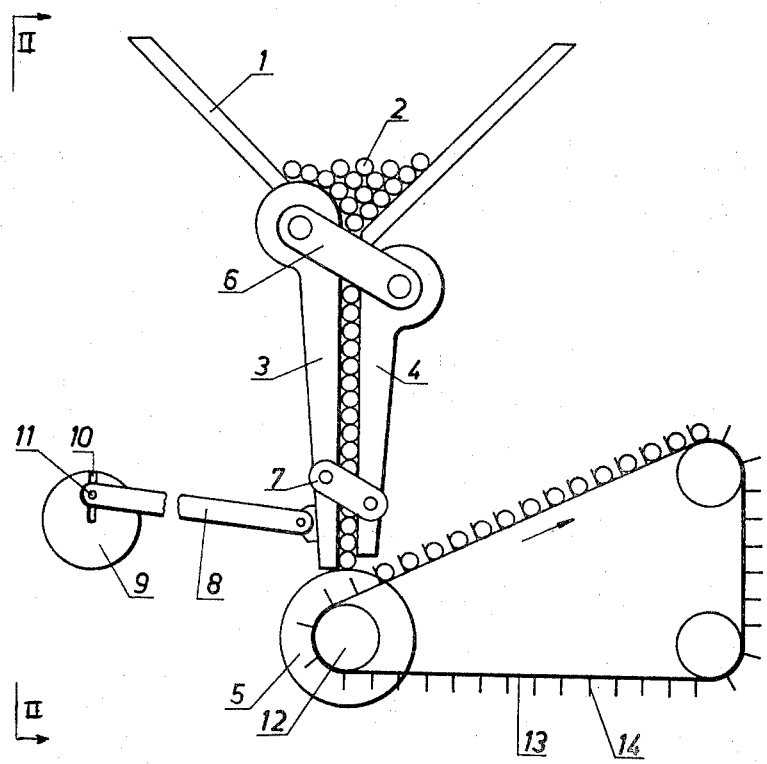
Figure 2:
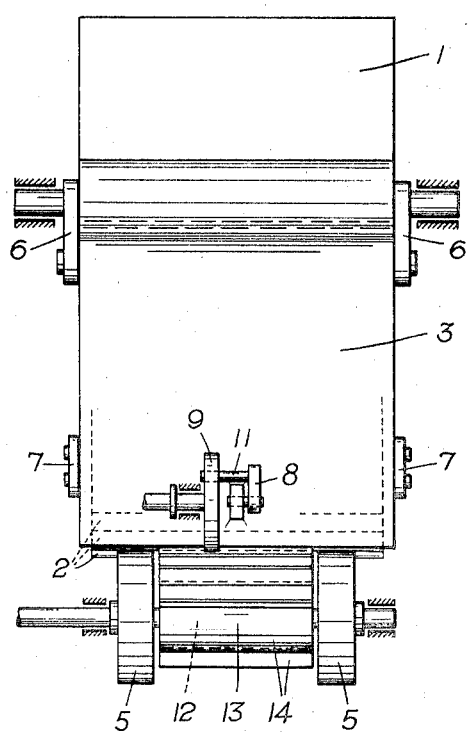

FIGURE 1 shows an elevation view of the invention;
FIGURE 2 shows a cross-sectional view taken substantially along line II—II of FIG. 1.

Coated welding rods 2 are contained in a supply hopper 1, which converges to form a guide chute, which conforms to the diameter of the welding rods. The side walls of this chute are formed by opposite guide elements, such as rails 3 and 4. Of these two side walls, one wall 3 is longer and extends to a horizontal cylinder 5, which is disposed under the duct. The other wall 4 is shorter and terminates short of the cylinder 5 by an amount which is somewhat smaller than the diameter of the rods to be fed. The two side walls 3, 4 are connected to straps 6, 7, which are adjustable in their angle to the longitudinal axis of the side wall 3 so that the cross-section of the chute can be changed to conform to the cross-section of the rods to be fed. A change of the angle between the straps and the longitudinal axis of the side wall 3 will result in a corresponding change of the distance of the side wall 4 from the cylinder 5. The side wall 3 and the side wall 4 connected to it are connected by a eccentric rod 8 to an eccentric disc 9, which has a groove 10, in which a slide block 11 is slidable.

The position of the slide block in the groove of the eccentric disc determines the amplitude of the vibration of the side walls during the rotation of the disc. Axially under the rods which are disposed one below the other in the feeding chute, a pulley 12 for driving a conveyor belt 13 is provided. This belt is set with transverse ribs 14. The drive pulley 12 is connected to the eccentric disc by means which are not shown in the drawing and which ensure that the drive pulley rotates in unison with the eccentric disc.

The apparatus according to the invention has the following mode of operation.

When the straps have been adjusted relative to the side wall 3 in accordance with the diameter of the rods to be fed, these rods are charged into the hopper and flow through the chute between the guide walls 3 and 4 until the lowermost rod rests on the periphery of cylinder 5. When the guide wall is in its vertical position assumed by it when the slide block is at its left-hand dead center in the groove of the eccentric disc 9, the distance from the guide wall 4 to the periphery of the cylinder 5 is slightly smaller than the diameter of the rod so that the rod cannot leave the chute and cannot roll laterally on the periphery of the cylinder 5. As the eccentric disc 9 rotates through 180°, the eccentric rod 8 effects a lateral pivotal movement of the guide walls 3 and 4 so that the lowermost rod 2 rolls laterally along the periphery of the cylinder 5 when the gap between the end of the guide wall 4 and the periphery of the cylinder 5 is so large that the rod can fall on the conveyor belt 13 from below this guide wall without obstruction. When the eccentric disc 9 rotates at a high speed, corresponding to a conveyance of 20 and more rods per second, as is required by an apparatus which cooperates with a press for coating welding wire electrodes, the electrodes will be thrown into the compartments of the belt conveyor, which revolves at a corresponding speed so that each compartment receives only one electrode. As a result, the electrodes are evenly spaced and extend in the same direction while being forwarded for further processing.

What is claimed is:
1. Apparatus for feeding rod-shaped articles such as welding electrodes from a supply container, said apparatus comprising a chute having two opposite guide walls adjustably connected to each other and adapted to be spaced from each other in accordance with the diam- eter of the articles at least one of said guide walls being pivotally suspended from said supply container, a rotatably mounted conveyor belt disposed under said chute and provided with outwardly extending, transverse ribs, horizontal transfer cylinder means rotatably mounted under said chute and having a peripheral surface portion disposed under the lower end of said chute and above said conveyor belt, one of said guide walls extending closely to said peripheral surface portion, the other of said guide walls normally terminating short of said peripheral surface portion by a distance which is less than the cross-section of the articles, and release means operatively connected to said guide walls for oscillating them and for cyclically raising said other guide wall to a position in which its lower end is spaced from said peripheral surface portion by a distance which exceeds the cross-section of said articles.

2. Apparatus as set forth in claim 1, in which said chute is inclined.

3. Apparatus as set forth in claim 1, in which said chute is substantially vertical.

4. Apparatus as set forth in claim 1, in which said reelase means comprise an eccentric disc operatively connected to said other guide wall and adapted to oscillate both guide walls.

5. Apparatus as set forth in claim 1, in which said release means comprise a camwheel operatively connected to said other guide wall.

6. Apparatus as set forth in claim 1, wherein the movements of said release means, said transfer cylinder means and said conveyor belt are synchronized.

References Cited

UNITED STATES PATENTS

| | | | |
|---|---|---|---|
| 2,613,861 | 10/1952 | Goerlitz | 221—224 |
| 2,676,733 | 4/1954 | Lober | 198—59 |
| 2,918,197 | 12/1959 | Ritscher | 221—225 |

RICHARD E. AEGERTER, *Primary Examiner.*